(12) United States Patent
Iida et al.

(10) Patent No.: US 8,159,186 B2
(45) Date of Patent: Apr. 17, 2012

(54) POWER SOURCE SYSTEM, POWER SUPPLY CONTROL METHOD FOR THE POWER SOURCE SYSTEM, POWER SUPPLY CONTROL PROGRAM FOR THE POWER SOURCE SYSTEM, AND COMPUTER-READABLE RECORDING MEDIUM WITH THE POWER SUPPLY CONTROL PROGRAM RECORDED THEREON

(75) Inventors: Takuma Iida, Osaka (JP); Tadao Kimura, Hyogo (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 12/524,068

(22) PCT Filed: Jan. 10, 2008

(86) PCT No.: PCT/JP2008/050209
§ 371 (c)(1),
(2), (4) Date: Jul. 22, 2009

(87) PCT Pub. No.: WO2008/093525
PCT Pub. Date: Aug. 7, 2008

(65) Prior Publication Data
US 2010/0026244 A1 Feb. 4, 2010

(30) Foreign Application Priority Data
Jan. 29, 2007 (JP) .................................. 2007-017830

(51) Int. Cl.
*H02J 7/00* (2006.01)
*H02J 1/10* (2006.01)

(52) U.S. Cl. ........ 320/132; 320/104; 320/118; 320/134; 307/43; 307/48

(58) Field of Classification Search .................. 320/132
See application file for complete search history.

(56) References Cited

U.S. PATENT DOCUMENTS
2001/0054878 A1* 12/2001 Odaohhara ................... 320/118
(Continued)

FOREIGN PATENT DOCUMENTS
EP 2 096 734 A1 9/2009
(Continued)

OTHER PUBLICATIONS
Extended European Search Report issued in European Patent Application No. EP 08703073.0 dated Aug. 17, 2011.

*Primary Examiner* — Edward Tso
*Assistant Examiner* — Johali Torres Ruiz
(74) *Attorney, Agent, or Firm* — McDermott Will & Emery LLP

(57) ABSTRACT

The present invention provides a power source system that increases the power supply capacity of a power source device and continuously supplies the power necessary for a load device when a power source device stops. A control unit has a state quantity setting unit that sets a first target state quantity indicating a state of charge of the power storage device that is to be a target value when charge and discharge of the power storage device are controlled. When the power source device stops, the state quantity setting unit can change the first target state quantity to a second target state quantity that is to be a target value exceeding the first target state quantity and can increase the target state quantity of the power storage device. As a result, when the power source device stops, charge and discharge of the power storage device are controlled on the basis of the target state quantity exceeding that during the operation of the power source device. Therefore, the state of charge of the power storage device can be improved over that during the operation of the power source device. As a result, the power supply capacity of the power source device can be increased and the power necessary for the load device can be continuously supplied, in place of the power source device.

7 Claims, 7 Drawing Sheets

U.S. PATENT DOCUMENTS

2004/0145926 A1* 7/2004 Kanouda et al. ............... 363/61
2007/0247106 A1* 10/2007 Kawahara et al. ............ 320/104

FOREIGN PATENT DOCUMENTS

| | | |
|---|---|---|
| JP | 11-199152 | 7/1999 |
| JP | 2004-72919 | 3/2004 |
| JP | 2004-357377 | 12/2004 |
| JP | 2005-341686 | 12/2005 |

* cited by examiner

POWER SOURCE SYSTEM, POWER SUPPLY CONTROL METHOD FOR THE POWER SOURCE SYSTEM, POWER SUPPLY CONTROL PROGRAM FOR THE POWER SOURCE SYSTEM, AND COMPUTER-READABLE RECORDING MEDIUM WITH THE POWER SUPPLY CONTROL PROGRAM RECORDED THEREON

RELATED APPLICATIONS

This application is the U.S. National Phase under 35 U.S.C. §371 of International Application No. PCT/JP2008/050209, filed on Jan. 10, 2008, which in turn claims the benefit of Japanese Application No. 2007-017830, filed on Jan. 29, 2007, the disclosures of which Applications are incorporated by reference herein.

TECHNICAL FIELD

The present invention relates to a power source system that is provided with a power storage device that supplies power when a power source device such as a commercial power source stops, a power supply control method for the power source system, a power supply control program for causing a computer to execute the power supply control method for the power source system, and a computer-readable recording medium with the power supply control program for the power source system recorded thereon.

BACKGROUND ART

Power storage devices have recently attracted attention and found practical use as backup power sources for commercial power sources. In a case where a commercial power source operates normally, a backup power source is charged, and when the commercial power source fails, the backup power source continues to supply power, in place of the commercial power source, to a device. A UPS (Uninterruptible Power Supply) is an example of such a system. When the commercial power supply stops, a network device such as a computer, a memory device, or a server that is being used is prevented from stopping by instantaneous switching to power supply from the backup power source.

In a backup power source combined with such a power storage device, control is performed so as to maintain a high residual capacity indicating a state of charge of the power storage device (referred to hereinbelow as "SOC"). Typically in such an elevator system, because the excess power is efficiently charged into the power storage device by a power generation action of a motor, charge control is performed so that the SOC does not increase to 100%. Furthermore, because the power is supplied to the motor when necessary, discharge control is performed to prevent the SOC from dropping to 0 (zero). More specifically, the control is usually performed to maintain the SOC of the power storage device within a range of 20 to 80%.

A hybrid elevator has been developed by providing an elevator with a vehicle cage and a counterweight, so that power consumption necessary during the operation is inhibited. In the hybrid elevator, where an abnormal state such as a stop occurs during operation, by using the power of the power storage device, it is possible to supply the power for driving the elevator from the power storage device, move the elevator to the nearest floor or any floor, and safely rescue the passengers located in the cage. For example, Patent Document 1 discloses a method by which an output voltage, an output current, and a temperature of a battery power source are detected and a rescue operation corresponding to a power supply capacity of the battery power source is performed as a control method for an automatic reach-a-floor device of the elevator.

With a known method for calculating a power supply capacity of a power source device that is used in the above-described backup power source, the power supply capacity is typically calculated from an open voltage, an inner resistance, and a minimum voltage of the power source device, as shown by the following Equation (1).

$$\text{Power Supply Capacity} = \text{Minimum Voltage} \times (\text{Open Voltage} - \text{Minimum Voltage})/\text{Inner Resistance} \quad (1)$$

A method for calculations from the open voltage, inner resistance, and maximum voltage of the power source, as shown by Equation (2) below, is known as a method for calculating the electric power regeneration capacity.

$$\text{Electric Power Regeneration Capacity} = \text{Maximum Voltage} \times (\text{Maximum Voltage} - \text{Open Voltage})/\text{Inner Resistance} \quad (2)$$

The minimum voltage and maximum voltage that are used when calculating the power supply capacity and electric power regeneration capacity are set with a certain margin with consideration for the service life of the power source device.

With the method disclosed in Patent Document 1, the output voltage value and voltage set value of the power source device are compared correspondingly to the discharge time, the discharge state of the battery is detected by the relationship between the two values, and the operation of elevator is controlled. Therefore, in a case, where the power supply capacity of the battery power source is small, the power supply capacity is zeroed, and power supply from the battery is terminated. A problem encountered in this case is that because the charge to the battery power source is started after the operation of the power source device is restored and the rescue operation is performed after the charge is completed, the rescue operation to the nearest floor usually cannot be performed when a failure of the power source occurs, and the passengers are locked up in the elevator.

Furthermore, in order to enable minimum operations to ensure safety and reliability in a case where the power source device stops due to an accident, as in the case of a hybrid elevator, a minimum necessary power supply capacity is required for the backup power source. As a result, a margin is necessary for the capacity of the power source device that is used in the backup power source and a large power source device is required.

The minimum voltage and maximum voltage that are used when the power supply capacity and electric power regeneration capacity of the power source device are calculated have a margin determined with consideration for a service life characteristic of the power storage device. Therefore, actual power supply capacity and electric power regeneration capacity assume values that are less than those of the original power supply capacity and electric power regeneration capacity of the power source device.

Patent Document 1: Japanese Patent Application Laid-open No. 11-199152

DISCLOSURE OF THE INVENTION

It is an object of the present invention to provide a power source system that can realize at least a minimum backup function by temporarily increasing the power supply capacity of a power storage device when a power source device stops due to an accident or the like and also enables extension of service life and miniaturization of the power storage device, and also to provide a power supply control method for the power source system, a power supply control program for the power control system, and a computer-readable recording medium with the power supply control program recorded thereon.

A power source system according to the first aspect of the invention includes a power source device that supplies power to a load device; a power storage device that supplies, in place of the power source device, power to the load device when the power source device stops; and a control unit that controls power supply from the power storage device to the load device, wherein the control unit has a stop determination unit that determines whether the power supply device has stopped; and a state quantity setting unit that sets a first target state quantity indicating a state of charge of the power storage device that is to be a target value when charge and discharge of the power storage device are controlled, in order to maintain the state of charge of the power storage device within a predetermined range, and the state quantity setting unit changes the first target state quantity to a second target state quantity that is to be a target value exceeding the first target state quantity in a case where the stop determination unit determines that the power source device has stopped.

With the above-described power source system, the stop determination unit determines whether the power source device has stopped, and where the power source device is determined to have stopped, the target state quantity of the power storage device can be increased. Thus, charge and discharge of the power storage device are controlled on the basis of a target state quantity that exceeds that during the operation of the power source device. Therefore, the state of charge of the power storage device can be improved over that during the operation of the power source device. As a result, the power supply capacity of the power storage device can be increased and the power necessary for the load device can be continuously supplied, in place of the power source device.

With the above-described power source system, the stop determination unit determines whether the power source device has stopped. Therefore, the power supply capacity of the power storage device can be increased only when the power source device stops. As a result, it is not necessary to increase the capacity of the power storage device in advance with consideration for the increase in power supply when the power source device stops, and the margin relating to the capacity of the power storage device can be reduced. As a result, miniaturization of the power storage device installed in the power source system can be facilitated.

BEST MODE FOR CARRYING OUT THE INVENTION

Embodiments of the present invention will be described below with reference to the appended drawings.

(Embodiment 1)

Figure 1:
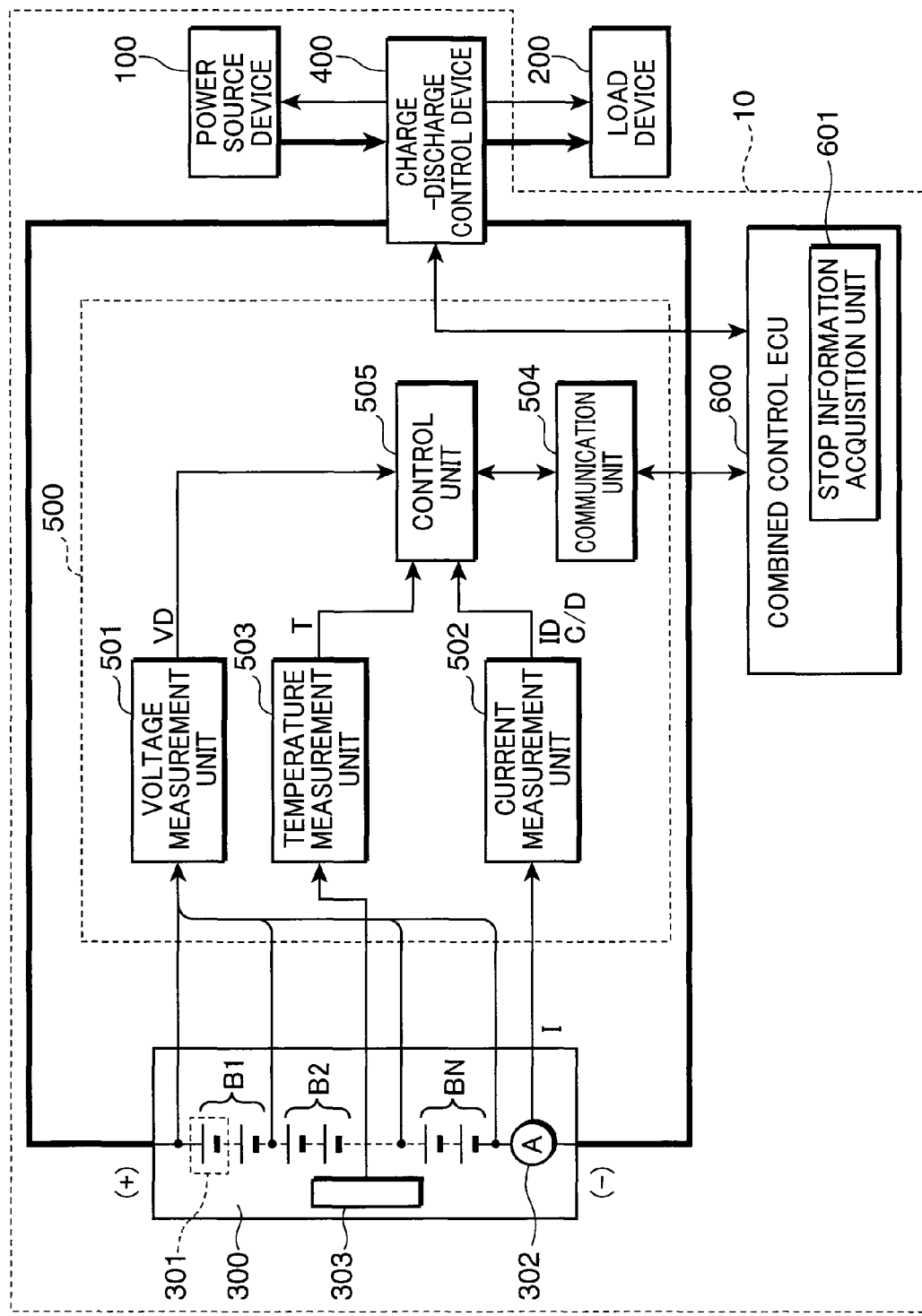
FIG. 1 is a block diagram illustrating the configuration of a power source system of Embodiment 1 of the present invention.

FIG. 1 is a block diagram illustrating the configuration of a power source system of Embodiment 1 of the present invention. As shown in FIG. 1, a power source system 10 of the present embodiment is provided with a power source device 100, a power storage device 300, a charge-discharge control device 400, a power supply control device 500, and a combined control ECU (Electronic Control Unit) 600.

The power source device 100 is, for example, a commercial power source and also includes a generator that uses an engine as a mechanical power source, and the like. A load device 200 includes various units that are driven by the supplied power.

The power storage device 300 stores extra power from the power source device 100 and regenerative electric power generated by the load device 200 and supplies, when necessary, the power stored therein to the load device 200. The power storage device 300 is configured by N storage element blocks B1, B2, . . . , BN that are connected in serial. Each storage element block B1, B2, . . . , BN is configured by electrically connecting in serial a plurality of storage elements 301. An alkaline storage battery such as a nickel-hydrogen storage battery, an organic battery such as a lithium ion battery, and an electric double-layer capacitor can be used as the storage element 301. The number N of the storage element blocks and the number of storage elements 301 are not particularly limited.

The power storage device 300 has an optimum operation voltage range in which battery characteristics, service life, and reliability of the power storage device 300 are not lost. This operation voltage range is determined by the minimum voltage, which is the lowest limit value, and a maximum voltage, which is the highest limit value.

The minimum voltage of the operation voltage range is a voltage that has to end the discharge of the power storage device 300, and usually in a case where the output voltage of the power storage device 300 is below the minimum voltage, the discharge of the power storage device 300, that is, power supply from the power storage device 300 stops. However, by temporarily reducing the minimum voltage, it is possible to continue further the supply of power from the power storage device 300. In this case, the power storage device 300 is temporarily overdischarged, but battery characteristics and the like of the power storage device 300 are not adversely affected as long as the overdischarge is implemented within a range in which battery characteristics, service life, and reliability of the power storage device 300 are not lost.

By contrast, the maximum voltage of the operation voltage range is a voltage that has to end the charge of the power storage device 300, and usually in a case where the output voltage of the power storage device 300 is above the maximum voltage, the charge of the power storage device 300 stops. However, by temporarily raising the maximum voltage, it is possible to continue further the charge of the power storage device 300 and increase the state of charge of the power storage device 300. In this case, the power storage device 300 is temporarily overcharged, but battery characteristics and the like of the power storage device 300 are not adversely affected as long as the overcharge is implemented within a range in which battery characteristics, service life, and reliability of the power storage device 300 are not lost.

The charge-discharge control device 400 controls the charge and discharge of the power storage device 300. The charge-discharge control device is connected to the power source unit 100, load device 200, and power storage device 300 and controls the charge of the power storage device 300 from the power source device 100 and the discharge from the power storage device 300 to the load device 200. In a case where the consumed current of the load device 200 abruptly increases or power required by the load device 200 exceeds a predetermined value, the charge-discharge control device 400 discharges the lacking power from the power storage device 300 to the load device 200.

The charge-discharge control by the charge-discharge control device 400 is usually performed so that a SOC of the power storage device 300 is within a range of about 20 to 80%. However, in load-equalized power sources or plug-in vehicles that use effectively the nighttime power, the control is performed so as to charge to a state with a SOC of 100% and discharge when energy is necessary in the load device.

The power supply control device 500 controls power supply from the power storage device 300 to the load device 200 when the power source device 100 stops.

The combined control ECU 600 is connected to the charge-discharge control device 400 and power supply control device 500 and controls the entire power source system 10.

The power supply control device 500 of the power source system 10 of Embodiment 1 of the present invention will be described below. Referring to FIG. 1, the power supply control device 500 is provided with a voltage measurement unit 501, a current measurement unit 502, a temperature measurement unit 503, a communication unit 504, and a control unit 505.

The voltage measurement unit 501 measures a voltage value of the power storage device 300. More specifically, the voltage measurement unit 501 measures sequentially in time, with a predetermined period, voltage V0, V1, V2, . . . , VN-1, VN between the terminals of respective N storage element blocks B1, B2, . . . , BN of the power storage device 300. The voltage between the terminals that has been measured for each storage element block is converted from an analog signal into a digital signal and voltage data for each block and added value thereof are outputted as voltage data VD of the power storage device 300. Data output from the voltage measurement unit 501 to the control unit 505 is conducted with a predetermined period. For example, a flying capacitor method is known as a method for measuring sequentially in time the voltage between the terminals for each storage element block.

The current measurement unit 502 measures a current value of the power storage device 300. More specifically, the current measurement unit 502 measures a charge-discharge current I of the power storage device 300 within the predetermined period by using a current sensor 302. The measured charge-discharge current is converted from an analog signal into a digital signal and outputted together with a sign C (Charge)/D (Discharge) that indicates a charge direction (+) and discharge direction (−) as current data ID. Data output from the current measurement unit 502 to the control unit 505 is also conducted with a predetermined period, similarly to the data output from the voltage measurement unit 501. The current sensor 302 in this configuration is constituted by a resistance element, a current transformer, and the like.

The temperature measurement unit 503 measures the temperature of the power storage device 300. More specifically, the temperature measurement unit 503 measures the temperature inside the power storage device 300 with a predetermined period by using a temperature sensor 303 disposed inside the power storage device 300. The measured temperature is converted from an analog signal into a digital signal and outputted with a predetermined period as temperature data T to the control unit 505.

The communication unit 504 can perform communication between the control unit 505 and the ECU 600. For example, the control unit 505 transmits the measured values such as voltage, temperature, and current of the power storage device 300, a SOC calculated by using the measured values, and failure information relating to the current sensor and the like to the ECU 600. The ECU 600, for example, can control the entire power source system 10 on the basis of the transmitted data. A communication means of the ECU 600 and communication unit 504 may be CAN and Ethernet (registered trade name). Wireless communication may be also used.

The control unit 505 controls various units located in the power supply control device 500. For example, it performs integration of current data ID outputted from the current measurement unit 502 over a predetermined period (for example, a period of equal to or shorter than 1 day) and calculates an integrated capacity Q. In a case where a sign C/D received together with the current data ID is in the charge direction (+) during this integration, the current data ID are multiplied by a charge efficiency (a coefficient less than 1, for example, 0.8). The control unit 505 predicts and stores the residual capacity SOC by using the integrated capacity Q.

The SOC is found herein by using the integrated capacity Q, as described hereinabove, but the present embodiment is not limited to this feature. For example, it is also possible to acquire a plurality of pair data of voltage data VD and current data ID for charge direction (+) and discharge direction (−), approximate these pair data by a straight line (VD-ID line), and find a load-free voltage Vo from a voltage segment that is an intersection point of the approximation line and the VD axis. Furthermore, it is also possible to calculate an electromotive force Vemf by subtracting a voltage drop caused by a polarization component and internal resistance of the power storage device 300 from the load-free voltage Vo and find the SOC corresponding to this electromotive force Vemf from the electromotive force—SOC characteristic table that has been found empirically in advance. In applications in which the temperature of the power storage device 300 changes significantly, it is possible to use temperature data T outputted from the temperature measurement unit 503 as correction parameters of the electromotive force—SOC characteristic table.

The processing of power supply control of the power supply control device 500 of the power source system 10 according to Embodiment 1 of the present invention will be described below.

In a case where the power supply control device 500 of the present embodiment supplies power from the power storage device 300 to the load device 200 when the power source device 100 stops, the state quantity of the power storage device 300 is reset and the power supply capacity from the power storage device 300 is increased. The processing of such power supply control will be described below in greater detail. First, the configuration of the control unit 505 will be described with reference to FIG. 2, and then the processing procedure of such power supply control will be described.

Figure 2:
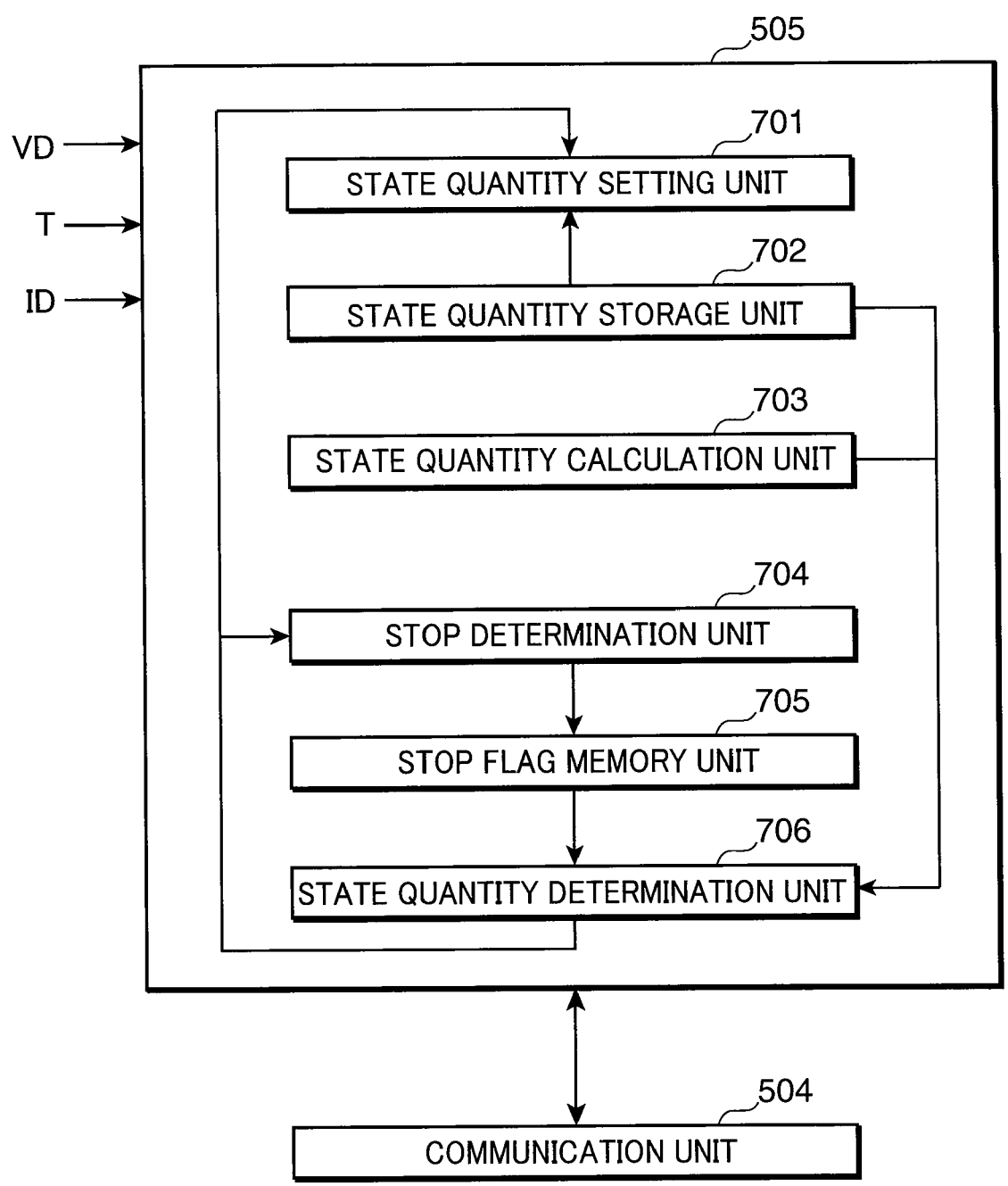
FIG. 2 is a block diagram illustrating the configuration of a control unit that implements the processing of power supply control of a power supply control device of Embodiment 1 of the present invention.

As mentioned hereinabove, the control unit 505 controls various units located in the power supply control device 500 and has, for example, the following configuration for implementing the processing of the above-described power supply control. FIG. 2 shows a configuration of the control unit 505 for realizing the process of power supply control of the power supply control device 500 of Embodiment 1 of the invention.

As shown in FIG. 2, the control unit 505 is provided with a state quantity setting unit 701, a state quantity memory unit 702, a state quantity calculation unit 703, a stop determination unit 704, a stop flag memory unit 705, and a state quantity determination unit 706.

The state quantity setting unit 701 sets a target value of state quantity (referred to hereinbelow as "target state quantity") of the power storage device 300 that is used during charge-discharge control of the power storage device 300. The charge-discharge control device 400 controls charge and discharge of the power storage device 300 on the basis of the target state quantity. The state quantity of the power storage device 300 is, for example, a SOC indicating the state of charge of the power storage device 300, and the state quantity setting unit 701 performs resetting of the target state quantity as necessary. The target state quantity that is set is outputted to the charge-discharge control device 400 via the communication unit 504 and the combined control ECU 600.

The state quantity memory unit 702 stores at least a target state quantity of the power storage device 300 when the power source device 100 operates (referred to hereinbelow as "normal target state quantity") and a target state quantity of the power storage device 300 when the power source device 100 stops (referred to hereinbelow as "abnormal target state quantity"). The power storage device 300 performs the charge-discharge control on the basis of the normal target state quantity (first target state quantity) when the power source device 100 operates, but performs the charge-discharge control on the basis of the abnormal target state quantity (second target state quantity), if necessary, when the power source device 100 stops. Because it is necessary to increase the power supply capacity of the power storage device 300 when the power source device 100 stops, the abnormal target state quantity is set to a value higher than the normal target state quantity.

The state quantity calculation unit 703 can calculate the actual state quantity of the power storage device 300. In a case where a state quantity is an SOC of the power storage device 300, the state quantity calculation unit 703 calculates the SOC of the power storage device 300 by performing current integration by using current data ID from the current measurement unit 502.

The stop determination unit 704 monitors the input of stop information relating to the power source device 100 to the control unit 505 and determines whether or not the input is made. The stop information relating to the power source device 100 is, for example, the stop of a commercial power supply or a main power supply. This information may also include accident information that indicates the possibility of the commercial power supply being stopped. The accident information may be meteorological information that predicts flood damage, fire information, and also earthquake information. It goes without saying that the accident information is not limited to these examples, and may be any accident information relating to or predicting the stoppage of the power source unit 100.

The stop flag storage 705 unit raises a stop flag (Flag=1) if the stop determination unit 704 determines that stop information of the power source device 100 is inputted.

The state quantity determination unit 706 determines whether the actual state quantity of the power storage device 300 that is computed by the state quantity calculation unit 703 is less than the abnormal target state quantity of the power storage device 300 when the stop flag is raised in the stop flag memory unit 705 (Flag=1).

Figure 3:
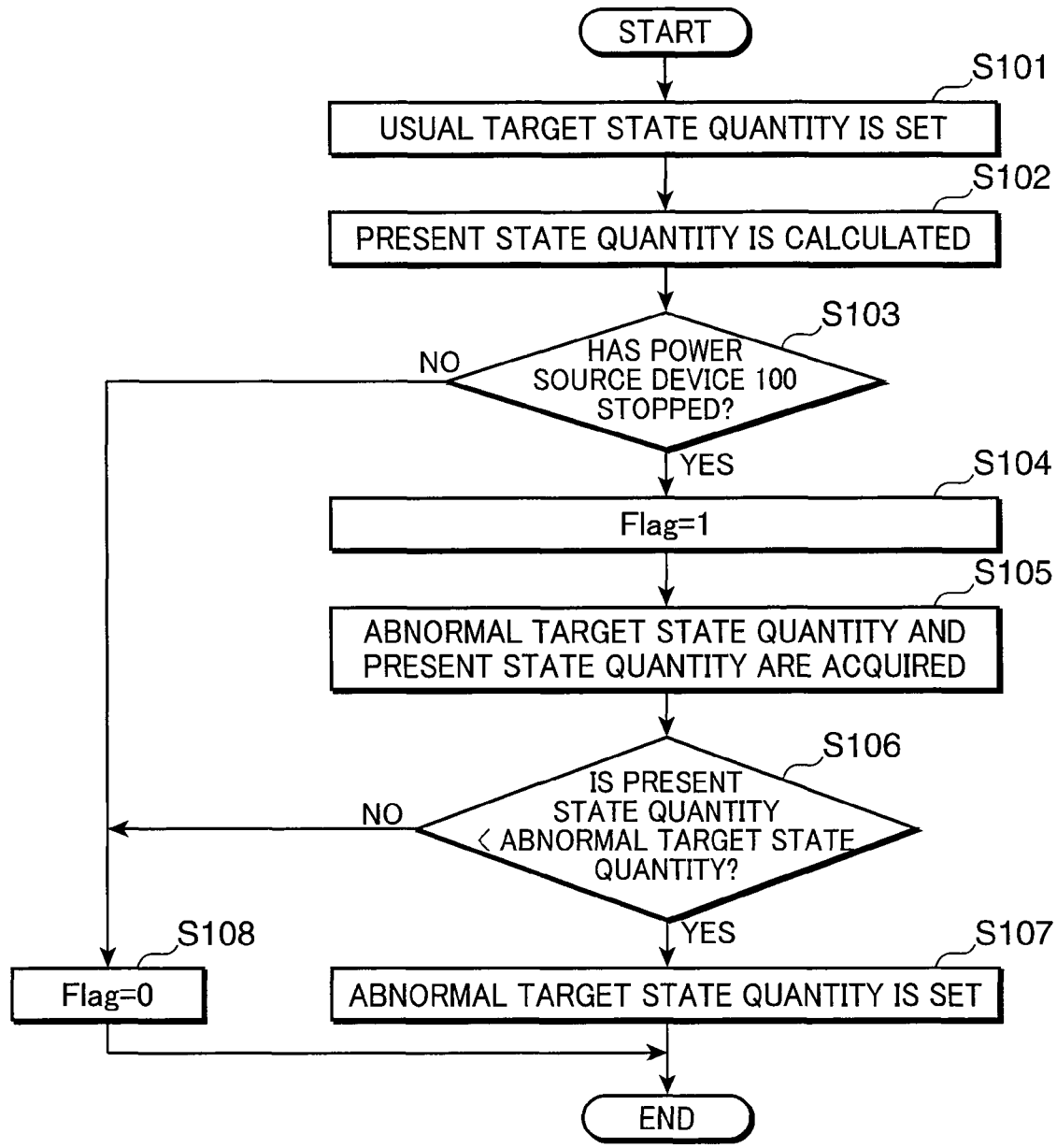
FIG. 3 is a flowchart that illustrates the processing sequence of power supply control of a power supply control device of Embodiment 1 of the present invention.

The processing procedure of the power supply control will be explained below with reference to FIG. 3. FIG. 3 is a flowchart showing the processing procedure of power supply control of the power supply control device 500 of Embodiment 1 of the invention.

As shown in FIG. 3, the state quantity setting unit 701 of the control unit 505 sets the normal target state quantity of the power storage device 300 as the target state quantity during normal operation in which the power source device 100 can supply power (step S101). The normal target state quantity of the power storage device 300 is stored in advance in the state quantity memory unit 702, and the state quantity setting unit 701 acquires the normal target state quantity from the state quantity memory unit 702. The normal target state quantity that has been set is outputted via the communication unit 504 to the combined control ECU 600. The combined control ECU 600 controls the charge-discharge control device 400 so that the charge-discharge control of the power storage device 300 is performed on the basis of the normal target state quantity.

The state quantity calculation unit 703 then calculates the present state quantity of the power storage device 300 by appropriately using the voltage data VD, current data ID, and temperature data T inputted from the voltage measurement unit 501, current measurement unit 502, and temperature measurement unit 503 (step S102).

The stop determination unit 704 monitors the input of stop information of the power source unit 100 to the control unit 505 and starts determining whether or not the input is present (step S103). In this case, the stop information of the power source device 100 is acquired by the combined control unit ECU 600 and outputted to the power supply control device 500. The combined control ECU 600 is provided inside thereof with a stop information acquisition unit 601 that serves for acquiring stop information of the power source device 100 and acquires the stop information of the power source device 100 from the outside by using the stop information acquisition unit 601. The stop information of the power source device 100 is information relating to power supply interruption from the power source device 100 due to accident such as meteorological conditions, fire, and earthquake, and the stop information acquisition unit 601 acquires this information. The stop information acquisition unit 601 may also directly detect the stop of power supply from the power source unit 100.

In a case where the stop determination unit 704 determines the power source device 100 has stopped (YES in step S103), the stop determination unit 704 raises a stop flag in the stop flag memory unit 705 (Flag=1) (step S104).

Where the stop flag is raised in the stop flag memory unit 705 (Flag=1), the state quantity determination unit 706 acquires the abnormal target state quantity of the power storage device 300 from the state quantity memory unit 702 and the present state quantity of the power storage device 300 from the state quantity calculation unit 703 (step S105).

The state quantity determination unit 706 then compares (step S106) the abnormal target state quantity and the present state quantity of the power storage device 300 that have been acquired in the above-described step S105, and in a case where the present state quantity is less than the abnormal target state quantity (YES in step S106), the state quantity setting unit 701 sets the abnormal target state quantity of the power storage device 300 as the target state quantity (step S107). The abnormal target state quantity that has been set is outputted from the control unit 505 to the communication unit 504. The power supply control device 500 uses the communication unit 504 to output the abnormal target state quantity that has been set to the combined control ECU 600. The combined control ECU 600 controls the charge-discharge control device 400 on the basis of the abnormal target state quantity that has been set.

By contrast, in a case where the power source device 100 is not stopped (NO in step S103) and in a case where the present state quantity of the power storage device 300 is equal to or greater than the abnormal target state quantity (NO in step S106), the stop flag memory unit 705 is initialized (Flag=0) (step S108).

The processing of power supply control of Embodiment 1 of the invention is thus implemented.

As described hereinabove, according to Embodiment 1 of the invention, by raising the target state quantity of the power storage device 300 when the power source device 100 stops, it is possible to increase the state of charge of the power storage device 300. Therefore, the power supply capacity of the power storage device 300 can be increased and the power necessary for the load device 200 can be continuously supplied.

With Embodiment 1 of the invention, the power supply capacity of the power storage device 300 can be increased only when the power source device 100 stops. Therefore, it is not necessary to increase the capacity of the power storage device 300 in advance with consideration for power supply when the power source device 100 stops. As a result, the margin relating to the capacity of the power storage device 300 can be reduced and miniaturization of the power storage device 300 can be facilitated.

In Embodiment 1 of the invention, the abnormal target state quantity of the power storage device 300 may be set in the abovementioned step S107, without comparing the abnormal target state quantity and the present state quantity of the power storage device 300 in the abovementioned step 106. Even in a case where the present state quantity of the power storage device 300 is equal to or greater than the abnormal target state quantity, the increase in the state of charge of the power storage device 300 can be rapidly started if setting is made in advance to the abnormal target state quantity.

Furthermore, in Embodiment 1 of the invention, in a case where the stop of the power source device 100 is cancelled and power supply from the power source device 100 returns to the normal state, the target state quantity of the power storage device 300 can be again returned to the normal target state quantity.

In addition, in Embodiment 1 of the invention, a program for realizing the processing of power supply control of the power supply control device 500 may be executed with a microcomputer. Thus, a power supply control program for realizing the state quantity setting unit 701, state quantity memory unit 702, state quantity calculation unit 703, stop determination unit 704, stop flag memory unit 705, and state quantity determination unit 706 provided in the control unit 505 shown in FIG. 2 may be installed in the microcomputer and the power supply control program may be executed with the microcomputer.

The power supply control method of the power supply control device 500 is realized by reading the power supply control program with the microcomputer and executing the program. It is also possible to install the power supply control program on a memory unit of the microcomputer and execute the power supply control program with a processing unit (Central Processing Unit: CPU) of the microcomputer. By executing the power supply control program with the processing unit of the microcomputer, it is possible to realize the state quantity setting unit 701, state quantity calculation unit 703, stop determination unit 704, and state quantity determination unit 706 and provide the state quantity memory unit 702 and stop flag memory unit 705 in the memory unit of the microcomputer.

In Embodiment 1 of the invention, the functions of the control unit 505 may be also imparted to the charge-discharge control device 400. In this case, for example, the above-described power supply control program may be installed in the microcomputer that constitutes the charge-discharge control device 400 and this program may be executed. It goes without saying that the functions of the charge-discharge control device 400 may be also provided to the control unit 505. Moreover, the functions of the control unit 505 may be imparted to the load device 200 or combined control ECU 600. For example, in a case of a configuration in which the combined control ECU 600 is imparted with the functions of the control unit 505, the power supply control device 500 is provided only with limited number of functions such as functions of measuring the voltage, temperature, and current of the power storage device 300.

(Embodiment 2)

Embodiment 2 of the invention will be described below with reference to the drawings. In the above-described Embodiment 1, in a case where power is supplied from the power storage device 300 to the load device 200 when the power source device 100 stops, the power supply capacity of the power storage device 300 is increased by raising the target state quantity of the power storage device 300. By contrast, in Embodiment 2 of the invention, in addition to raising the target state quantity of the power storage device 300 as in Embodiment 1, where the load device 200 has a plurality of power consumption modes, the load device 200 is shifted to a low power consumption mode when the power source device 100 stops. As a result, the power required by the load device 200 when the power source device 100 stops is reduced and the state of charge of the power storage device 300 is further enhanced, thereby increasing the power supply capacity of the power storage device 300.

Figure 4:
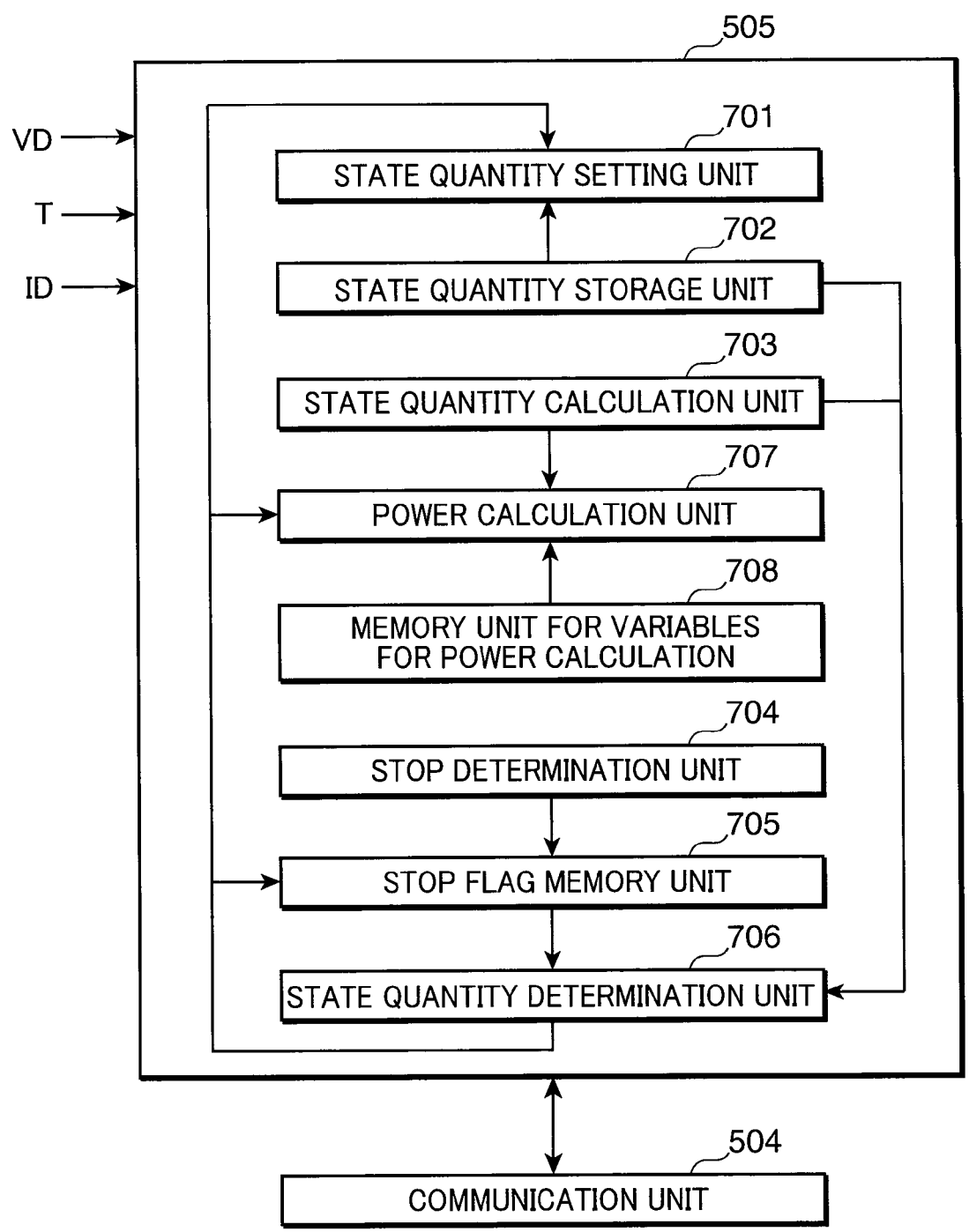
FIG. 4 is a block diagram illustrating the configuration of a control unit that implements the processing of power supply control of a power supply control device of Embodiment 2 of the present invention.

The processing of power supply control of the power supply control device of the power source system of Embodiment 2 of the invention will be described below. The power source system of the present embodiment essentially can be realized by the same configuration as that of the power source system shown in FIG. 1. However, the configuration provided to a control unit 505 to realize the processing of power supply control of a power supply control device 500 of the present embodiment is different. FIG. 4 shows the configuration of the control unit 505 of the present embodiment.

As shown in FIG. 4, the control unit 505 of the present embodiment is provided with a state quantity setting unit 701, a state quantity memory unit 702, a state quantity calculation unit 703, a stop determination unit 704, a stop flag memory unit 705, a state quantity determination unit 706, a power calculation unit 707, and a memory unit 708 for variables for power calculation. The state quantity setting unit 701, state quantity memory unit 702, state quantity calculation unit 703, stop determination unit 704, stop flag memory unit 705, and state quantity determination unit 706 have the same configuration as in Embodiment 1 and will not be explained herein.

The power calculation unit 707 calculates outputable power that can be presently outputted by the power storage device 300 by using the present state quantity of the power storage device 300 that is calculated by the state quantity calculation unit 703. In the present embodiment, the state quantity calculation unit 703 calculates a present open voltage of the power storage device 300 in addition to the above-described SOC. The open voltage is calculated by subtracting a polarization voltage and a voltage drop caused by the internal resistance of the power storage device 300 from voltage data VD from the voltage measurement unit 501. The power calculation unit 707 can calculate the present outputable power (power supply capacity) of the power storage device 300, for example, by the above-described Equation (1), by using the open voltage of the power storage device 300.

The memory unit 708 for variables for power calculation stores variables that are used to determine the power actually outputted to the load device 200, from among the outputable power of the power storage device 300, to match a plurality of power consumption modes of the load device 200. For example, in a case where the load device 200 has been shifted to a low power consumption mode, variables (parameters) are used to make the output power of the power storage device 300 a part of the outputable power at the point of time of this shift. More specifically, where a variable value is set, for example, to "0.25" and the load device 200 is shifted to a low power consumption mode, the outputable power of the power storage device 300 at the point of time of this shift is multiplied by "0.25", and the actual output power of the power storage device 300 is reduced to one fourth of the outputable power.

Figure 5:
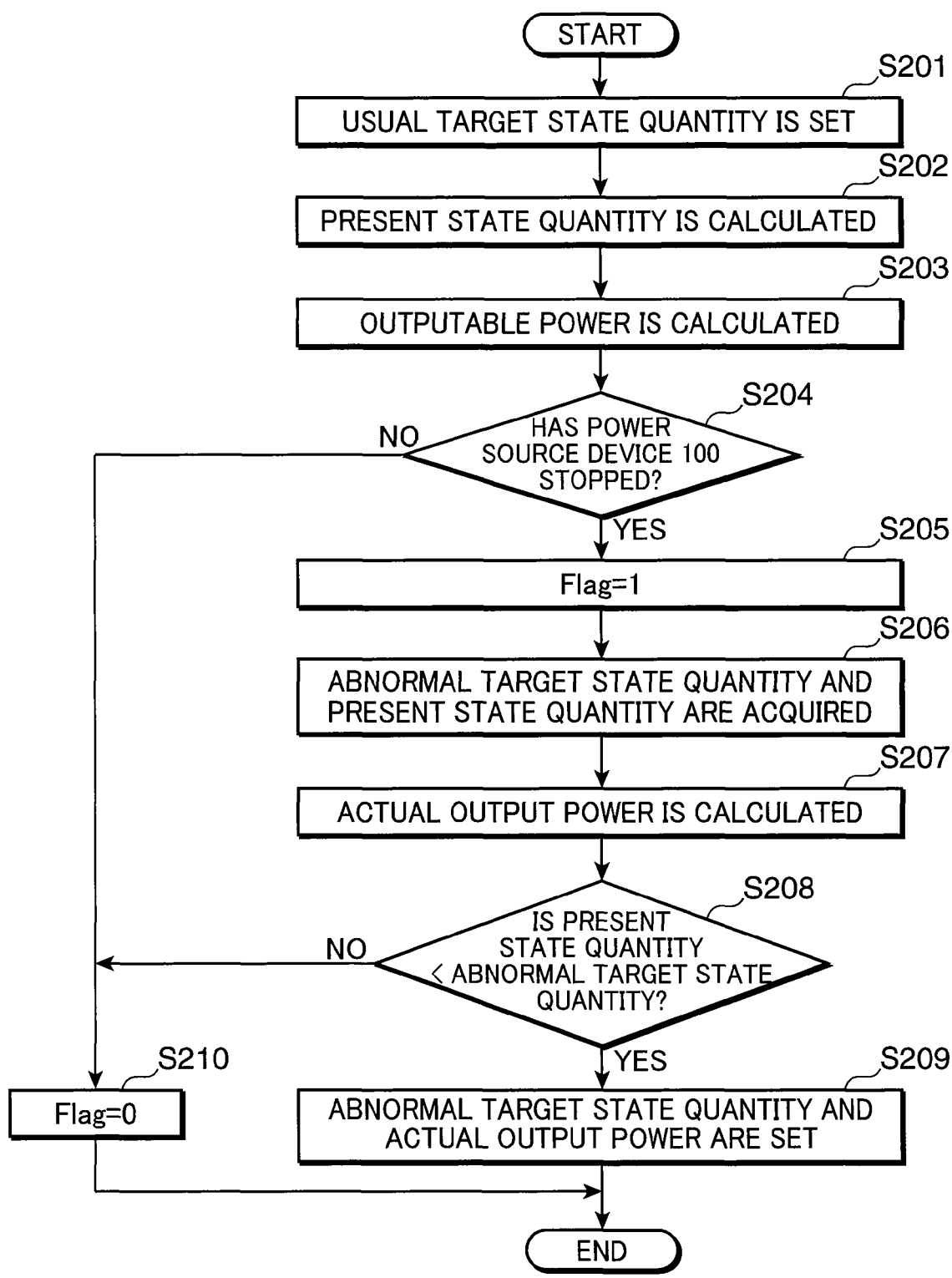
FIG. 5 is a flowchart that illustrates the processing sequence of power supply control of a power supply control device of Embodiment 2 of the present invention.

The processing procedure of such power supply control will be explained below with reference to FIG. 5. FIG. 5 is a flowchart illustrating the processing procedure of power supply control of the power supply control device 500 of Embodiment 2 of the invention.

As shown in FIG. 5, the state quantity setting unit 701 of the control unit 505 sets a normal target state quantity of the power storage device 300 as the target state quantity during normal operation when power can be supplied from the power source device 100 (step S201). The normal target state quantity of the power storage device 300 is stored in advance in the state quantity memory unit 702, and the state quantity setting unit 701 acquires the normal target state quantity from the state quantity memory unit 702. The normal target state quantity that has been set is outputted to a combined control ECU 600 via a communication unit 504. The combined control ECU 600 controls the charge-discharge control device 400 so that charge-discharge control of the power storage device 300 is performed on the basis of this normal target state quantity.

The state quantity calculation unit 703 then calculates the present state quantity of the power storage device 300 by appropriately using the voltage data VD, current data ID, and temperature data T inputted from a voltage measurement unit 501, a current measurement unit 502, and a temperature measurement unit 503 (step S202).

The power calculation unit 707 then calculates the present outputable power of the power storage device 300 (step S203).

The stop determination unit 704 then monitors the input of stop information of the power source device 100 to the control unit 505 and starts determining whether the input is present (step S204).

In a case where the stop determination unit 704 determines that the power source device 100 has stopped (YES in step S204), the stop determination unit 704 raises a stop flag in the stop flag memory unit 705 (Flag=1) (step S205).

Where the stop flag is raised in the stop flag memory unit 705 (Flag=1), the state quantity determination unit 706 acquires the abnormal target state quantity of the power storage device 300 from the state quantity memory unit 702 and the present state quantity of the power storage device 300 from the state quantity calculation unit 703 (step S206).

The power calculation unit 707 acquires a predetermined variable from the memory unit 708 for variables for output calculation, which stores variables for output calculation, and calculates the power that is actually outputted to the load device 200 when the load device 200 is shifted to a low power consumption mode by using the acquired predetermined variable (step S207).

The state quantity determination unit 706 then compares (step S208) the abnormal target state quantity and the present state quantity of the power storage device 300 that have been acquired in the above-described step S206, and in a case where the present state quantity is less than the abnormal target state quantity (YES in step S208), the state quantity setting unit 701 sets the abnormal target state quantity of the power storage device 300 as the target state quantity and also sets a power that will be actually outputted by the power storage device 300 (step S209). The abnormal target state quantity and actual output power that have been set are outputted from the control unit 505 to the communication unit 504. The power supply control device 500 uses the communication unit 504 to output the abnormal target state quantity and actual output power that have been set to the combined control ECU 600. The combined control ECU 600 controls the charge-discharge control device 400 on the basis of the abnormal target state quantity and actual output power that have been set.

By contrast, in a case where the power source device 100 is not stopped (NO in step S204) and in a case where the present state quantity of the power storage device 300 is equal to or greater than the abnormal target state quantity (NO in step S208), the stop flag memory unit 705 is initialized (Flag=0) (step S210).

The processing of power supply control of Embodiment 2 of the invention is thus implemented.

As described hereinabove, according to Embodiment 2 of the invention, by raising the target state quantity of the power storage device 300 when the power source device 100 stops, it is possible to increase the state of charge of the power storage device 300. Therefore, the power supply capacity of the power storage device 300 can be increased and the power necessary for the load device 200 can be continuously supplied.

Furthermore, with Embodiment 2 of the invention, the power supply capacity of the power storage device 300 can be increased only when the power source device 100 stops. Therefore, it is not necessary to increase the capacity of the power storage device 300 in advance with consideration for power supply when the power source device 100 stops. As a result, the margin relating to the capacity of the power storage device 300 can be reduced and miniaturization of the power storage device 300 can be facilitated.

Furthermore, with Embodiment 2 of the invention, when the power source device 100 stops, the load device 200 is shifted to a low power consumption mode, and the power that is actually outputted by the power storage device 300 to the load device 200 is decreased. Therefore, the state of charge of the power storage device 300 can be further increased and power supply capacity of the power storage device 300 can be raised.

In Embodiment 2 of the invention, in a case where the stop of the power source device 100 is cancelled and power supply from the power source device 100 returns to the normal state, the target state quantity of the power storage device 300 can be again returned to the normal target state quantity.

In addition, in Embodiment 2 of the invention, similarly to the above-described Embodiment 1, a program for realizing the processing of power supply control of the power supply control device 500 may be executed with a microcomputer. Thus, a power supply control program for realizing the state quantity setting unit 701, state quantity memory unit 702, state quantity calculation unit 703, stop determination unit 704, stop flag memory unit 705, state quantity determination unit 706, power calculation unit 707, and memory unit 708 for variables for power calculation that are provided in the control unit 505 shown in FIG. 4 may be installed in the microcomputer and the power supply control program may be executed with the microcomputer.

The power supply control method of the power supply control device 500 is realized by reading the power supply control program with the microcomputer and executing the program. It is also possible to install the power supply control program in a memory unit of the microcomputer and execute the power supply control program with a processing unit (CPU) of the microcomputer. By executing the power supply control program with the processing unit of the microcomputer, it is possible to realize the state quantity setting unit 701, state quantity calculation unit 703, stop determination unit 704, state quantity determination unit 706, and power calculation unit 707 and provide the state quantity memory unit 702, stop flag memory unit 705, and memory unit 708 for variables for power calculation in the memory unit of the microcomputer.

In Embodiment 2 of the invention, the functions of the control unit 505 may be also imparted to the charge-discharge control device 400 and the functions of the charge-discharge control device 400 may be also provided to the control unit 505. Moreover, the functions of the control unit 505 may be imparted to the load device 200 or combined control ECU 600.

(Embodiment 3)

Embodiment 3 of the invention will be described below with reference to the drawings. In the above-described Embodiment 1, in a case where power is supplied from the power storage device 300 to the load device 200 when the power source device 100 stops, the power supply capacity of the power storage device 300 is increased by raising the target state quantity of the power storage device 300. Furthermore, in the above-described Embodiment 2, the power necessary for the load device 200 is reduced and power supply capacity of the power storage device 300 is increased by shifting the load device 200 to a low power consumption mode when the power source device 100 stops.

By contrast, in Embodiment 3 of the invention, in addition to raising the target state quantity of the power storage device 300 as in Embodiment 1, the power charged to the power storage device 300 when the power source device 100 stops in increased. As a result, the state of charge of the power storage device 300 is further enhanced and power supply capacity of the power storage device 300 is increased.

The processing of power supply control of the power supply control device of the power source system of Embodiment 3 of the invention will be described below. The power source system of the present embodiment essentially can be realized by the same configuration as that of the power source system shown in FIG. 1. Furthermore, the configuration provided to a control unit 505 to realize the processing of power supply control of a power supply control device 500 of the present embodiment essentially also can be realized by the same configuration as that shown in FIG. 4. However, the functions of the power calculation unit 707 and memory unit 708 for variables for power calculation, which are shown in FIG. 4, are different from those of the above-described Embodiment 2. This difference will be described below.

The power calculation unit 707 calculates the inputable power that can be presently charged into the power storage device 300 by using the present state quantity of the power storage device 300 that is calculated by a state quantity calculation unit 703. In the present embodiment, the state quantity calculation unit 703 calculates the present open voltage of the power storage device 300 in addition to the above-described SOC. The power calculation unit 707 can calculate the present inputable power (electric power regeneration capacity) of the power storage device 300, for example, by the above-described Equation (2), by using the open voltage of the power storage device 300.

A memory unit 708 for variables for power calculation stores variables that are used to determine the power that is actually inputted in the power storage device 300 when the power source device 100 stops. When the power source device 100 stops, the variables (parameters) are used to charge the power storage device 300 with power that is greater than the present inputable capacity of the power storage device 300. More specifically, where a variable value is set, for example, to "1.5" and the power source device 100 stops, the inputable power of the power storage device 300 at the point of time of this stop is multiplied by "1.5", and the actual input power of the power storage device 300 is increased to a power that is 1.5 times the inputable power.

Figure 6:
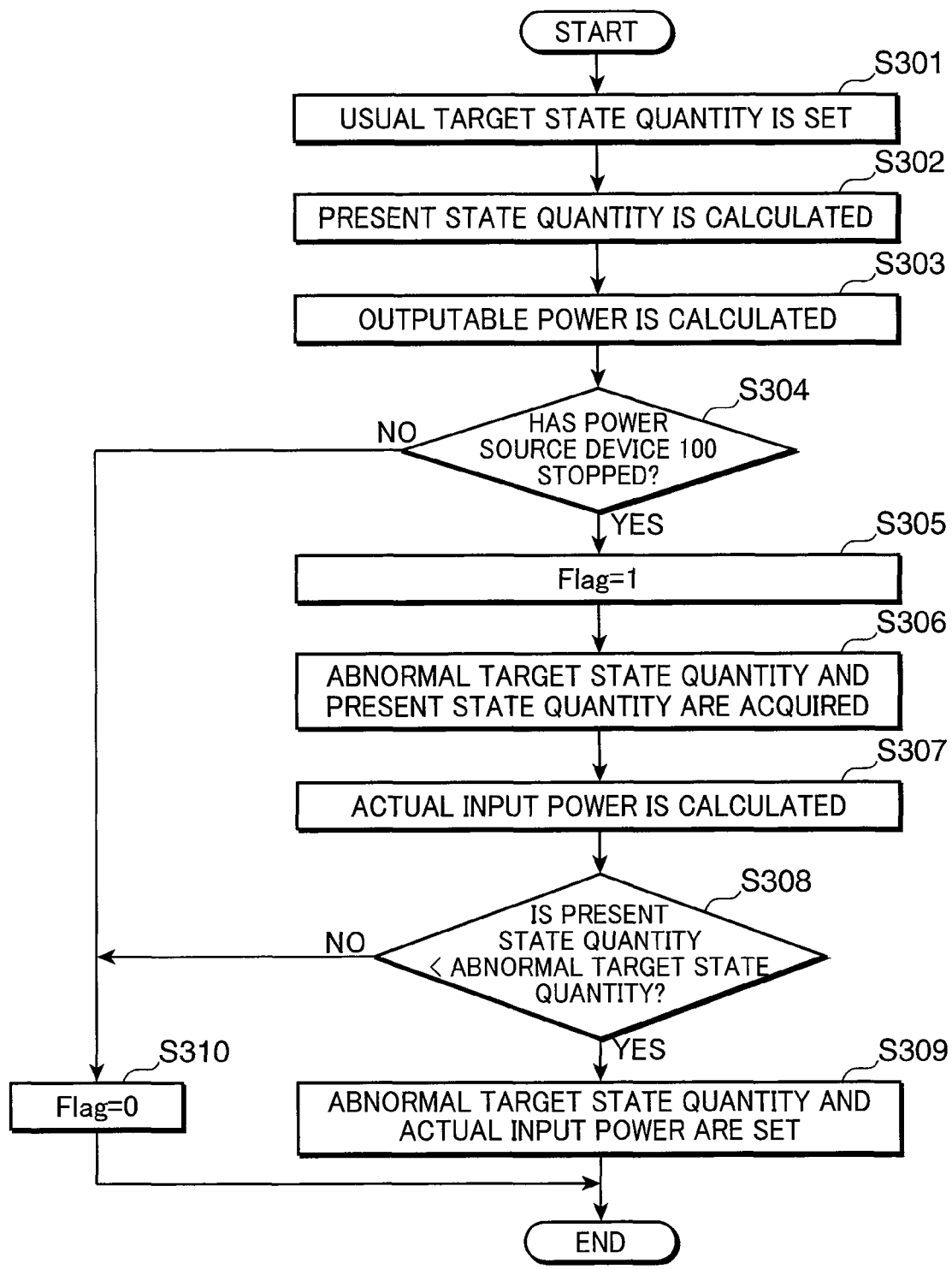
FIG. 6 is a flowchart that illustrates the processing sequence of power supply control of a power supply control device of Embodiment 3 of the present invention.

The processing procedure of such power supply control will be explained below with reference to FIG. 6. FIG. 6 is a flowchart illustrating the processing procedure of power supply control of the power supply control device 500 of Embodiment 3 of the invention.

As shown in FIG. 6, the state quantity setting unit 701 of the control unit 505 sets a normal target state quantity of the power storage device 300 as the target state quantity during normal operation when power can be supplied from the power source device 100 (step S301). The normal target state quantity of the power storage device 300 is stored in advance in the state quantity memory unit 702, and the state quantity setting unit 701 acquires the normal target state quantity from the state quantity memory unit 702. The normal target state quantity that has been set is outputted to a combined control ECU 600 via a communication unit 504. The combined control ECU 600 controls the charge-discharge control device 400 so that charge-discharge control of the power storage device 300 is performed on the basis of this normal target state quantity.

The state quantity calculation unit 703 then calculates the present state quantity of the power storage device 300 by appropriately using the voltage data VD, current data ID, and temperature data T inputted from a voltage measurement unit 501, a current measurement unit 502, and a temperature measurement unit 503 (step S302).

The power calculation unit 707 then calculates the present outputable power of the power storage device 300 (step S303).

The stop determination unit 704 then monitors the input of stop information of the power source device 100 to the control unit 505 and starts determining whether the input is present (step S304).

In a case where the stop determination unit 704 determines that the power source device 100 has stopped (YES in step S304), the stop determination unit 704 raises a stop flag in the stop flag memory unit 705 (Flag=1) (step S305).

Where the stop flag is raised in the stop flag memory unit 705 (Flag=1), the state quantity determination unit 706 acquires the abnormal target state quantity of the power storage device 300 from the state quantity memory unit 702 and the present state quantity of the power storage device 300 from the state quantity calculation unit 703 (step S306).

The power calculation unit 707 acquires a predetermined variable from the memory unit 708 for variables for output calculation, which stores variables for output calculation, and calculates the power that is actually inputted in the power storage device 300 by using the acquired predetermined variable (step S307).

The state quantity determination unit 706 then compares (step S308) the abnormal target state quantity and the present state quantity of the power storage device 300 that have been acquired in the above-described step S306, and in a case where the present state quantity is less than the abnormal target state quantity (YES in step S308), the state quantity setting unit 701 sets the abnormal target state quantity of the power storage device 300 as the target state quantity and also sets a power that will be actually inputted in the power storage device 300 (step S309). The abnormal target state quantity and actual input power that have been set are outputted from the communication unit 504 to output the abnormal target state quantity and actual input power that have been set to the combined control ECU 600. The combined control ECU 600 controls the charge-discharge control device 400 on the basis of the abnormal target state quantity and actual input power that have been set.

By contrast, in a case where the power source device 100 is not stopped (NO in step S304) and in a case where the present state quantity of the power storage device 300 is equal to or greater than the abnormal target state quantity (NO in step S308), the stop flag memory unit 705 is initialized (Flag=0) (step S310).

The processing of power supply control of Embodiment 3 of the invention is thus implemented.

As described hereinabove, according to Embodiment 3 of the invention, by raising the target state quantity of the power storage device 300 when the power source device 100 stops, it is possible to increase the state of charge of the power storage device 300. Therefore, the power supply capacity of the power storage device 300 can be increased and the power necessary for the load device 200 can be continuously supplied.

Furthermore, with Embodiment 3 of the invention, the power supply capacity of the power storage device 300 can be increased only when the power source device 100 stops. Therefore, it is not necessary to increase the capacity of the power storage device 300 in advance with consideration for power supply when the power source device 100 stops. As a result, the margin relating to the capacity of the power storage device 300 can be reduced and miniaturization of the power storage device 300 can be facilitated.

Furthermore, with Embodiment 3 of the invention, when the power source device 100 stops, the input power that charges the power storage device 300 is increased. As a result, the state of charge of power storage device 300 can be further increased and the power supply capacity of the power storage device 300 can be raised.

In Embodiment 3 of the invention, in a case where the stop of the power source device 100 is cancelled and power supply from the power source device 100 returns to the normal state, the target state quantity of the power storage device 300 can be again returned to the normal target state quantity.

In addition, in Embodiment 3 of the invention, similarly to the above-described Embodiment 2, a program for realizing the processing of power supply control of the power supply control device 500 may be executed with a microcomputer. In Embodiment 3 of the invention, the functions of the control unit 505 may be also imparted to the charge-discharge control device 400 and the functions of the charge-discharge control device 400 may be also provided to the control unit 505. Moreover, the functions of the control unit 505 may be imparted to the load device 200 or combined control ECU 600.

(Embodiment 4)

Embodiment 4 of the invention will be described below with reference to the drawings. In the above-described Embodiment 1, in a case where power is supplied from the power storage device 300 to the load device 200 when the power source device 100 stops, the power supply capacity of the power storage device 300 is increased by raising the target state quantity of the power storage device 300. Furthermore, in the above-described Embodiment 2, the power necessary for the load device 200 is reduced and power supply capacity of the power storage device 300 is increased by shifting the load device 200 to a low power consumption mode when the power source device 100 stops. In the above-described Embodiment 3, the state of charge of the power storage device 300 is further increased and power supply capacity of the power storage device 300 is increased by increasing the power charged into the power storage device 300.

By contrast, in Embodiment 4 of the invention, in addition to raising the target state quantity of the power storage device 300 as in Embodiment 1, the output power of the power storage device 300 is reduced as in the above-described Embodiment 2 and the input power of the power storage device 300 is increased as in the above-described Embodiment 3.

The processing of power supply control of the power supply control device of the power source system of Embodiment 4 of the invention will be described below. The power source system of the present embodiment essentially can be realized by the same configuration as that of the power source system shown in FIG. 1. Furthermore, the configuration provided to a control unit 505 to realize the processing of power supply control of a power supply control device 500 of the present embodiment essentially also can be realized by the same configuration as that shown in FIG. 4. However, the power calculation unit 707 and memory unit 708 for variables for power calculation that are shown in FIG. 4 are imparted with functions of both the Embodiment 2 and the Embodiment 3.

Figure 7:
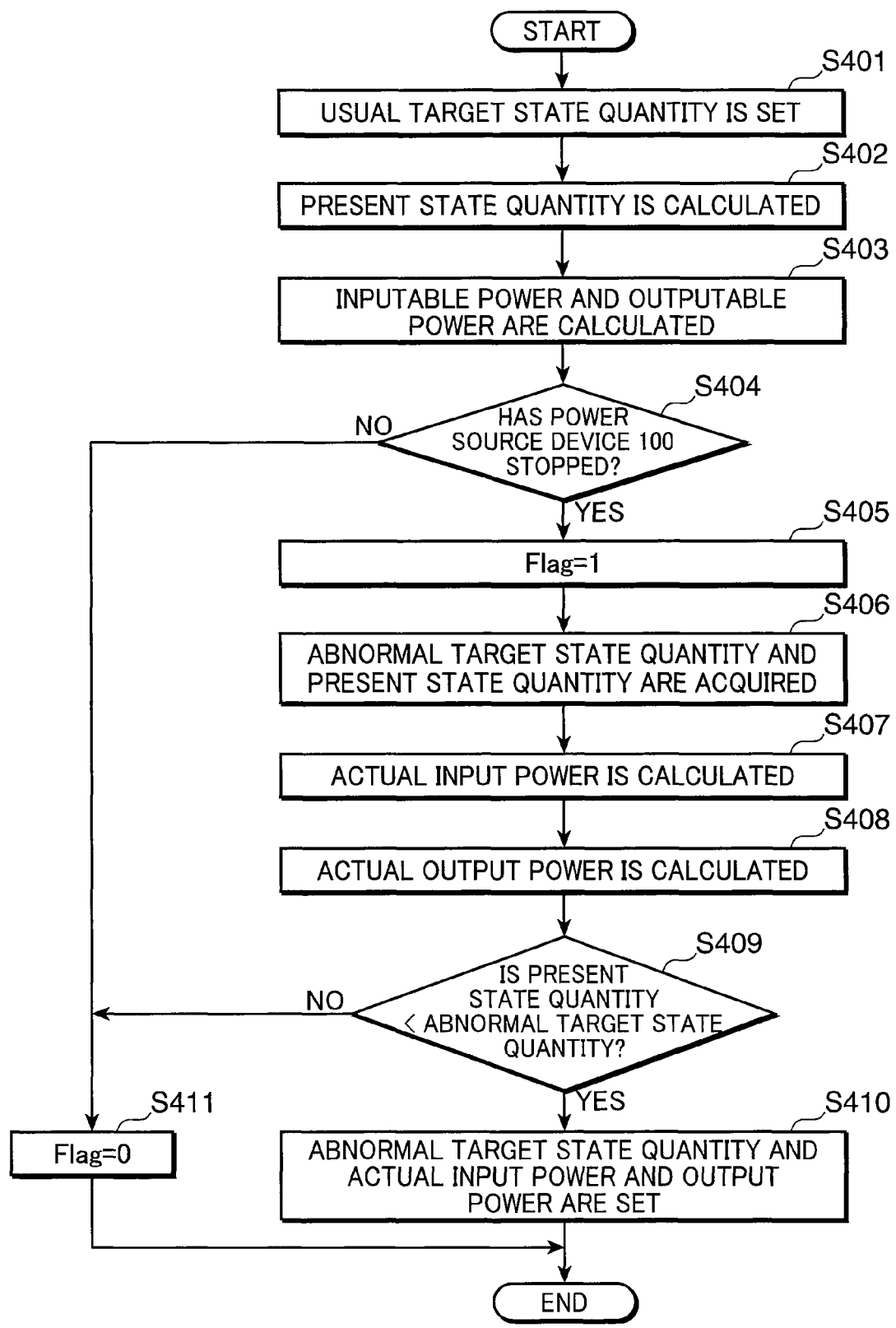
FIG. 7 is a flowchart that illustrates the processing sequence of power supply control of a power supply control device of Embodiment 4 of the present invention.

The processing of the power supply control will be described below with reference to FIG. 7. FIG. 7 is a flowchart illustrating the processing procedure of power supply control of the power supply control device 500 of Embodiment 4 of the invention.

As shown in FIG. 7, the state quantity setting unit 701 of the control unit 505 sets a normal target state quantity of the power storage device 300 as the target state quantity during normal operation when power can be supplied from the power source device 100 (step S401). The normal target state quantity of the power storage device 300 is stored in advance in the state quantity memory unit 702, and the state quantity setting unit 701 acquires the normal target state quantity from the state quantity memory unit 702. The normal target state quantity that has been set is outputted to a combined control ECU 600 via a communication unit 504. The combined control ECU 600 controls the charge-discharge control device 400 so that charge-discharge control of the power storage device 300 is performed on the basis of this normal target state quantity.

The state quantity calculation unit 703 then calculates the present state quantity of the power storage device 300 by appropriately using the voltage data VD, current data ID, and temperature data T inputted from a voltage measurement unit 501, a current measurement unit 502, and a temperature measurement unit 503 (step S402).

The power calculation unit 707 then calculates the present inputable power and outputable power of the power storage device 300 (step S403).

The stop determination unit 704 then monitors the input of stop information of the power source device 100 to the control unit 505 and starts determining whether the input is present (step S404).

In a case where the stop determination unit 704 determines that the power source device 100 has stopped (YES in step S404), the stop determination unit 704 raises a stop flag in the stop flag memory unit 705 (Flag=1) (step S405).

Where the stop flag is raised in the stop flag memory unit 705 (Flag=1), the state quantity determination unit 706 acquires the abnormal target state quantity of the power storage device 300 from the state quantity memory unit 702 and the present state quantity of the power storage device 300 from the state quantity calculation unit 703 (step S406).

The power calculation unit 707 then acquires a predetermined variable from the memory unit 708 for variables for output calculation, which stores variables for output calculation, and calculates the power that is actually inputted in the power storage device 300 by using the acquired predetermined variable (step S407). Furthermore, the power calculation unit 707 also acquires a predetermined variable from the memory unit 708 for variables for output calculation, which stores variables for output calculation, and calculates the power that is actually outputted by the power storage device 300 by using the acquired predetermined variable (step S408).

The state quantity determination unit 706 then compares (step S409) the abnormal target state quantity and the present state quantity of the power storage device 300 that have been acquired in the above-described step S406, and in a case where the present state quantity is less than the abnormal target state quantity (YES in step S409), the state quantity setting unit 701 sets the abnormal target state quantity of the power storage device 300 as the target state quantity and also sets a power that will be actually inputted in the power storage device 300 and a power that will be actually outputted by the power storage device 300 (step S410). The abnormal target state quantity, actual input power, and actual output power that have been set are outputted from the control unit 505 to the communication unit 504. The power supply control device 500 uses the communication unit 504 to output the abnormal target state quantity, actual input power, and actual output power that have been set to the combined control ECU 600. The combined control ECU 600 controls the charge-discharge control device 400 on the basis of the abnormal target state quantity, actual input power, and actual output power that have been set.

By contrast, in a case where the power source device 100 is not stopped (NO in step S404) and in a case where the present state quantity of the power storage device 300 is equal to or greater than the abnormal target state quantity (NO in step S409), the stop flag memory unit 705 is initialized (Flag=0) (step S411).

The processing of power supply control of Embodiment 4 of the invention is thus implemented.

As described hereinabove, according to Embodiment 4 of the invention, by raising the target state quantity of the power storage device 300 when the power source device 100 stops, it is possible to increase the state of charge of the power storage device 300. Therefore, the power supply capacity of the power storage device 300 can be increased and the power necessary for the load device 200 can be continuously supplied.

Furthermore, with Embodiment 4 of the invention, the power supply capacity of the power storage device 300 can be increased only when the power source device 100 stops. Therefore, it is not necessary to increase the capacity of the power storage device 300 in advance with consideration for power supply when the power source device 100 stops. As a result, the margin relating to the capacity of the power storage device 300 can be reduced and miniaturization of the power storage device 300 can be facilitated.

With Embodiment 4 of the invention, when the power source device 100 stops, the load device 200 is shifted to a low power consumption mode, and the power that is actually outputted by the power storage device 300 to the load device 200 is decreased. Therefore, the state of charge of the power storage device 300 can be further increased and power supply capacity of the power storage device 300 can be raised.

In Embodiment 4 of the invention, when the power source device 100 stops, the input power that charges the power storage device 300 is increased. Therefore, the state of charge of the power storage device 300 can be further increased and power supply capacity of the power storage device 300 can be raised.

In Embodiment 4 of the invention, in a case where the stop of the power source device 100 is cancelled and power supply from the power source device 100 returns to the normal state, the target state quantity of the power storage device 300 can be again returned to the normal target state quantity.

In addition, in Embodiment 4 of the invention, similarly to the above-described Embodiments 2 and 3, a program for realizing the processing of power supply control of the power supply control device 500 may be executed with a microcomputer. In Embodiment 4 of the invention, the functions of the control unit 505 may be also imparted to the charge-discharge control device 400 and the functions of the charge-discharge control device 400 may be also provided to the control unit 505. Moreover, the functions of the control unit 505 may be imparted to the load device 200 or combined control ECU 600.

In accordance with the invention, a power source system can be provided in which the power supply capacity of the power storage device can be increased and power necessary for the load unit can be continuously supplied by temporarily increasing the state of charge of the power source unit. The invention also provides a power supply control method for the power supply system, a program for executing with a computer the power supply control method for the power supply system, and a computer-readable recording medium having recorded thereon the power supply control method for the power supply system.

The embodiments of the invention that are disclosed herein are exemplary and not limiting. The scope of the invention is represented by the claims, rather than by the disclosed contents, and can be construed to include the meanings equivalent to those of the claims and all the variations within the scope of the claims.

The summary of the invention that is based on the above-described embodiments is presented below. A power source system according to the first aspect of the invention includes a power source device that supplies power to a load device; a power storage device that supplies, in place of the power source device, power to the load device when the power source device stops; and a control unit that controls power supply from the power storage device to the load device, wherein the control unit has a stop determination unit that determines whether the power supply device has stopped; and a state quantity setting unit that sets a first target state quantity indicating a state of charge of the power storage device that is to be a target value when charge and discharge of the power storage device are controlled, in order to maintain the state of charge of the power storage device within a predetermined range, and the state quantity setting unit changes the first target state quantity to a second target state quantity that is to be a target value exceeding the first target state quantity when the stop determination unit determines that the power source device has stopped.

With the above-described power source system, the stop determination unit determines whether the power source device has stopped, and where the power source device is determined to have stopped, the target state quantity of the power storage device can be increased. Thus, charge and discharge of the power storage device are controlled on the basis of a target state quantity that exceeds that during the operation of the power source device. Therefore, the state of charge of the power storage device can be improved over that during the operation of the power source device. As a result, the power supply capacity of the power storage device can be increased and the power necessary for the load device can be continuously supplied, in place of the power source device.

With the above-described power source system, the stop determination unit determines whether the power source device has stopped. Therefore, the power supply capacity of the power storage device can be increased only when the power source unit stops. Thus, it is not necessary to increase the capacity of the power storage device in advance with consideration for the increase in power supply when the power source device stops, and the margin relating to the capacity of the power storage device can be reduced. As a result, miniaturization of the power storage device installed in the power source system can be facilitated.

It is preferred that the control unit further have a state quantity calculation unit that uses data of at least one type from among voltage data, current data, and temperature data of the power storage device to calculate a present state quantity that indicates a present state of charge of the power storage device; and a state quantity determination unit that determines whether the present state quantity of the power storage device is lower than the second target state quantity, and the state quantity setting unit changes the first target state quantity to the second target state quantity in a case where the power source device is determined to have stopped and in a case where the present state quantity of the power storage device is determined to be lower than the second target state quantity.

With such a configuration, the target state quantity of the power storage device can be set to the second target state quantity only when the present state quantity of the power storage device is less than the second target state quantity of the power storage device when the power source device is stopped. In a case where the present state quantity of the power storage device is equal to or greater than the second target state quantity, changes in the target state quantity of the power storage device that are essentially not required are not made. As a result, because the amount of unnecessary processing is reduced, the charge-discharge control of the power storage device can be executed more efficiently.

It is also preferred that the control unit further have an output power calculation unit that calculates an outputable power that can be outputted by the power storage device by using the present state quantity of the power storage device that is calculated by the state quantity calculation unit, and sets a power that is lower than the calculated outputable power of the power storage device as a power that is to be actually outputted from the power storage device when the stop determination unit determines that the power source device has stopped.

With such a configuration, the power that is actually outputted by the power storage device can be reduced when the power source device stops. Because of such a reduction, the state of charge of the power storage device can be increased and the power supply capacity of the power storage device can be raised.

The load device preferably has a plurality of power consumption modes that include at least a normal power consumption mode and a low power consumption mode, and the power consumption mode of the load device is shifted to the low power consumption mode in a case where a power that is lower than the outputable power of the power storage device that is calculated by the power calculation unit is set as a power that is to be actually outputted from the power storage device.

With such a configuration, when the power that is actually outputted by the power storage device is reduced when the power source device is stopped, the power consumption mode of the load device can be shifted to the low power consumption mode. As a result, the state of charge of the power storage device can be increased and the power supply capacity of the power storage device can be raised, while the load device executes a minimum function corresponding to the low power consumption mode thereof.

It is preferred that the control unit further have an input power calculation unit that calculates an inputable power that can be inputted in the power storage device in order to charge the power storage device, by using the present state quantity of the power storage device that is calculated by the state quantity calculation unit, and sets a power that is higher than the calculated inputable power of the power storage device as a power that is to be actually inputted in the power storage device in a case where the stop determination unit determines that the power source device has stopped.

With such a configuration, the input power that charges the power storage device can be increased when the power source device stops. Because of such an increase, the state of charge of the power storage device can be further increased and the power supply capacity of the power storage device can be raised.

A power supply control method for a power source system according to another aspect of the invention is a power supply control method for a power source system provided with a power storage device that supplies, in place of a power source device, power to a load device when the power source device that supplies power to the load device stops, including: a first step of setting a first target state quantity indicating a state of charge of the power storage device that is to be a target value when charge and discharge of the power storage device are controlled, in order to maintain the state of charge of the power storage device within a predetermined range; and a second step of controlling charge and discharge of the power storage device on the basis of the first target state quantity of the power storage device that is set in the first step, wherein the first step includes a step of changing the first target state quantity to a second target state quantity that is to be a target value exceeding the first target state quantity when the power source device stops.

With the above-described power supply control method for a power source system, the target state quantity of the power storage device can be increased in a case where the power source device has stopped. Thus, charge and discharge of the power storage device are controlled on the basis of a target state quantity that exceeds that during the operation of the power source device. Therefore, the state of charge of the power storage device can be improved over that during the operation of the power source device. As a result, the power supply capacity of the power storage device can be increased and the power necessary for the load device can be continuously supplied, in place of the power source device.

With the above-described power supply control method for a power source system, the power supply capacity of the power storage device can be increased only when the power source unit stops. Therefore, it is not necessary to increase the capacity of the power storage device in advance with consideration for the increase in power supply when the power source device stops, and the margin relating to the capacity of the power storage device can be reduced. As a result, miniaturization of the power storage device installed in the power source system can be facilitated.

A power supply control program for a power source system according to yet another aspect of the invention is a power supply control program for a power source system provided with a power storage device that supplies, in place of a power source device, power to a load device when the power source device that supplies power to the load device stops, the power supply control program causing a computer to function as: a stop determination unit that determines whether the power supply device has stopped; and a state quantity setting unit that sets a first target state quantity indicating a state of charge of the power storage device that is to be a target value when charge and discharge of the power storage device are controlled, in order to maintain the state of charge of the power storage device within a predetermined range, wherein the state quantity setting unit changes the first target state quantity to a second target state quantity that is to be a target value exceeding the first target state quantity when the stop determination unit determines that the power source device has stopped.

With the above-described power supply control program for a power source system, the stop determination unit determines whether the power source device has stopped, and where the power source device is determined to have stopped, the target state quantity of the power storage device can be increased. Thus, charge and discharge of the power storage device are controlled on the basis of a target state quantity that exceeds that during the operation of the power source device. Therefore, the state of charge of the power storage device can be improved over that during the operation of the power source device. As a result, the power supply capacity of the power storage device can be increased and the power necessary for the load device can be continuously supplied, in place of the power source device.

With the above-described power supply control program for a power source system, the stop determination unit determines whether the power source device has stopped. Therefore, the power supply capacity of the power storage device can be increased only when the power source unit stops. Thus, it is not necessary to increase the capacity of the power storage device in advance with consideration for the increase in power supply when the power source device stops, and the margin relating to the capacity of the power storage device can be reduced. As a result, miniaturization of the power storage device installed in the power source system can be facilitated.

A computer-readable recording medium that has recorded thereon a power supply control program for a power source system according to yet another aspect of the invention is a computer-readable recording medium that has recorded thereon a power supply control program for a power source system provided with a power storage device that supplies, in place of a power source device, power to a load device when the power source device that supplies power to the load device stops, wherein the power supply control program causes a computer to function as: a stop determination unit that determines whether the power supply device has stopped; and a state quantity setting unit that sets a first target state quantity indicating a state of charge of the power storage device that is to be a target value when charge and discharge of the power storage device are controlled, in order to maintain the state of charge of the power storage device within a predetermined range, the state quantity setting unit changing the first target state quantity to a second target state quantity that is to be a target value exceeding the first target state quantity when the stop determination unit determines that the power source device has stopped.

With the above-described computer-readable recording medium that has recorded thereon a power supply control program for a power source system, the stop determination unit determines whether the power source device has stopped, and where the power source device is determined to have stopped, the target state quantity of the power storage device can be increased. Thus, charge and discharge of the power storage device are controlled on the basis of a target state quantity that exceeds that during the operation of the power source device. Therefore, the state of charge of the power storage device can be improved over that during the operation of the power source device. As a result, the power supply capacity of the power storage device can be increased and the power necessary for the load device can be continuously supplied, in place of the power source device.

With the above-described computer-readable recording medium that has recorded thereon a power supply control program for a power source system, the stop determination unit determines whether the power source device has stopped. Therefore, the power supply capacity of the power storage device can be increased only when the power source unit stops. Thus, it is not necessary to increase the capacity of the power storage device in advance with consideration for the increase in power supply when the power source device stops, and the margin relating to the capacity of the power storage device can be reduced. As a result, miniaturization of the power storage device installed in the power source system can be facilitated.

Industrial Applicability

The power source system, power supply control method for the power source system, power supply control program for the power control system, and computer-readable recording medium with the power supply control program for the power source system recorded thereon are effective for power sources and devices having a backup power source function and have industrial applicability.

The invention claimed is:

1. A power source system comprising:
   a power source device that supplies power to a load device;
   a power storage device that supplies, in place of the power source device, power to the load device when the power source device stops; and
   a control unit that controls power supply from the power storage device to the load device,
   wherein the control unit has:
   a stop determination unit that determines whether the power supply device has stopped; and
   a state quantity setting unit that sets a first target state quantity indicating a state of charge of the power storage device that is to be a target value when charge and discharge of the power storage device are controlled, in order to maintain the state of charge of the power storage device within a predetermined range, and the state quantity setting unit changes the first target state quantity to a second target state quantity that is to be a target value exceeding the first target state quantity in a case where the stop determination unit determines that the power source device has stopped.

2. The power source system according to claim 1, wherein the control unit further has:

a state quantity calculation unit that uses data of at least one type from among voltage data, current data, and temperature data of the power storage device to calculate a present state quantity that indicates a present state of charge of the power storage device; and a state quantity determination unit that determines whether the present state quantity of the power storage device is lower than the second target state quantity, and the state quantity setting unit changes the first target state quantity to the second target state quantity in a case where the power source device is determined to have stopped and in a case where the present state quantity of the power storage device is determined to be lower than the second target state quantity.

3. The power source system according to claim 2, wherein the control unit further has an input power calculation unit that calculates an inputable power that can be inputted in the power storage device in order to charge the power storage device, by using the present state quantity of the power storage device that is calculated by the state quantity calculation unit, and sets a power that is higher than the calculated inputable power of the power storage device as a power that is to be actually inputted in the power storage device in a case where the stop determination unit determines that the power source device has stopped.

4. The power source system according to claim 2, wherein the control unit further has an output power calculation unit that calculates an outputable power that can be outputted by the power storage device by using the present state quantity of the power storage device that is calculated by the state quantity calculation unit, and sets a power that is lower than the calculated outputable power of the power storage device as a power that is to be actually outputted from the power storage device when the stop determination unit determines that the power source device has stopped.

5. The power source system according to claim 4, wherein the load device has a plurality of power consumption modes that include at least a normal power consumption mode and a low power consumption mode, and the power consumption mode of the load device is shifted to the low power consumption mode in a case where a power that is lower than the outputable power of the power storage device that is calculated by the power calculation unit is set as a power that is to be actually outputted from the power storage device.

6. A power supply control method for a power source system provided with a power storage device that supplies, in place of a power source device, power to a load device when the power source device that supplies power to the load device stops, the power supply control method comprising:

a first step of setting a first target state quantity indicating a state of charge of the power storage device that is to be a target value when charge and discharge of the power storage device are controlled, in order to maintain the state of charge of the power storage device within a predetermined range; and a second step of controlling charge and discharge of the power storage device on the basis of the first target state quantity of the power storage device that is set in the first step, wherein the first step includes a step of changing the first target state quantity to a second target state quantity that is to be a target value exceeding the first target state quantity when the power source device stops.

7. A computer-readable recording medium that has recorded thereon a power supply control program for a power source system provided with a power storage device that supplies, in place of a power source device, power to a load device when the power source device that supplies power to the load device stops, wherein the power supply control program causes a computer to function as:

a stop determination unit that determines whether the power supply device has stopped; and a state quantity setting unit that sets a first target state quantity indicating a state of charge of the power storage device that is to be a target value when charge and discharge of the power storage device are controlled, in order to maintain the state of charge of the power storage device within a predetermined range, the state quantity setting unit changing the first target state quantity to a second target state quantity that is to be a target value exceeding the first target state quantity when the stop determination unit determines that the power source device has stopped.

* * * * *